(12) United States Patent
Satti

(10) Patent No.: US 9,163,944 B2
(45) Date of Patent: Oct. 20, 2015

(54) SYSTEM AND METHOD FOR DISPLAYING THREE DIMENSIONAL VIEWS OF POINTS OF INTEREST

(71) Applicant: Rajasekhar Reddy Satti, Hyderabad (IN)

(72) Inventor: Rajasekhar Reddy Satti, Hyderabad (IN)

(*) Notice: Subject to any disclaimer, the term of this patent is extended or adjusted under 35 U.S.C. 154(b) by 0 days.

(21) Appl. No.: 14/475,856

(22) Filed: Sep. 3, 2014

(65) Prior Publication Data

US 2015/0233717 A1    Aug. 20, 2015

(30) Foreign Application Priority Data

Feb. 17, 2014    (IN) .............................. 449/DEL/2014

(51) Int. Cl.
*G01C 21/00*    (2006.01)

(52) U.S. Cl.
CPC ...................................... *G01C 21/00* (2013.01)

(58) Field of Classification Search
CPC ....................................................... G01C 21/00
USPC ................................................. 701/438, 426
See application file for complete search history.

(56) References Cited

U.S. PATENT DOCUMENTS

2006/0200304 A1* 9/2006 Oh ................................. 701/200
2011/0288763 A1* 11/2011 Hui ............................... 701/201

* cited by examiner

*Primary Examiner* — Mary Cheung
*Assistant Examiner* — Brian P Sweeney
(74) *Attorney, Agent, or Firm* — Hudak, Shunk & Farine Co. LPA

(57) ABSTRACT

The present invention relates to a system and method for displaying 3 dimensional (3D) view of points of interest (POI) on a moving map, said method comprises storing in a first database, information relating to a flight path of an aircraft and storing in a second database, at least one 3D model of the at least one or more POI, said model associated with one or more 3D views of the related POI. The method further comprises mapping the location of the at least one or more POI stored on second database with the location of the aircraft and retrieving the 3D model, associated 3D views and related information of said 3D model based on the mapped location. Further, integrating the retrieved 3D views and related information of said 3D model with the moving map on the mapped location and displaying the 3D views of POI on the moving map.

22 Claims, 11 Drawing Sheets

SYSTEM AND METHOD FOR DISPLAYING THREE DIMENSIONAL VIEWS OF POINTS OF INTEREST

FIELD OF THE INVENTION

The present invention relates to moving maps display in aircrafts, and particularly, relates to a method and a system for providing three dimensional (3D) views of points of interest (POI) on moving maps and related information thereof.

BACKGROUND OF THE INVENTION

The ease and efficiency of modern day air travel has shrunk the geography of the world and people are able to travel from one place to another around the world traveling longer distances than before. As a result, air travel for many involves spending longer durations on board depending upon the distance between the departure and destination points. In order to keep passengers entertained, modern day aircrafts come equipped with entertainment programs such as music, games and videos, which are typically pre-stored and are displayed to the passengers on a display screen based on their choice and selection. These display screens may be rectangular shaped screens provided on the rear side of each cabin seat, viewable by the passenger sitting behind and facing the front portion of display screen. Some aircrafts are equipped with display screens which provide passengers moving maps showing views of the aircraft's transit path and other transit related information such as flight symbols, departure and destination marker beacons, track line i.e., path of journey from departure point to destination point, and names of cities etc. nearer to the present position of flight along with pointers. Display of such information is enabled by a system which typically utilizes the present location of the aircraft and, based on other information collected from the navigation system and global positioning receiver of the aircraft, shows moving maps providing visual representation of one or more transit related information. Generally, the moving maps show the above details in two dimensional view on the display screen with some information being presented in a three dimensional view.

During flight transit, the moving map as shown on the display screen re-orients itself based on the location of the flight and the information displayed on the screen is continuously updated to show the present location, altitude, ground speed, true airspeed, weather information etc., which keeps the passengers updated on the transit and location information of the aircraft. In long haul flights or in travel over cities with historical importance, passengers may desire seeing and learning about various historic places/monuments, either natural or man-made, which are present between the proposed departure and destination points. Such offer of knowledge on the historic places of interest provides a new kind of knowledge oriented entertainment which may be of interest to several passengers on board. For example, a person taking a flight from United States of America to Paris, there can many points of interest such as Statue of Liberty, Eiffel tower, etc. which a passenger would like to see and learn about.

However, due to the altitude of flight, and climatic conditions, it is not possible to view in real time such points of interest. There may be systems provided in aircraft display screens that allow the user to view some static images of a monument as an aircraft crosses it during its flight path; however, the view is static and does not enhance the visual or learning experience for the passenger. There is also no audio program associated with a certain point of interest that would provide information on that particular point of interest so as to educate the passenger on the historical/architectural/geographical importance of the monument/point of interest.

Accordingly, in order to provide the passengers an enhanced entertainment option and to enrich their visual experience on the points of interest encountered in the aircraft's flight path, there exists a need for technology which enables the passengers to visualize a point of interest as a three-dimensional model which provides one or more different types of views on moving maps to further enhance the visual experience of the passenger.

There also exists a need for technology which enables the passengers to learn about a specific point of interest while viewing it on the display screen by providing the option of an audio program audio program associated with a certain point of interest that would provide historical/architectural/geographical information on that particular point of interest.

SUMMARY OF THE INVENTION

It is an objective of the present invention to provide a system and a method for displaying and viewing one or more points of interest (POI) on a moving map display based on a three-dimensional model (3D Model) of the POI. The method comprises the steps of storing in a first database, information comprising at least one of the identity of one or more airports, airport location, place names and their latitude and longitudinal position, and storing in a second database, a plurality of 3D Models of one or more points of interest along with one or more 3D views associated with each 3D model and information comprising at least the location details, POI name in different languages and details of said point of interest. The method further comprises retrieving the current location of the aircraft and displaying, via a virtual camera, a moving map based on the data stored on first database and mapping the location of three-dimensional point of interest with a location on the moving map. The method also comprises the steps of mapping a location to one or more points of interest based on the flight path, retrieving the 3D Model for the point of interest from the second database, integrating the location and POI information with respect to the moving map display, and displaying information in three dimensions on the moving map display.

It is yet another objective of the present invention to provide a system for storing, retrieving and displaying 3D views associated with a 3D Model of a point of interest on a moving map, said system comprising a first database to store information comprising at least one or identity of airports, airport location, place name and their latitude and longitudinal position, a display unit for displaying a moving map based on the data stored on first database, said display being configured to view a geographical area. The system further comprises a second database for storing a plurality of 3D Models of one or more points of interest along with information comprising at least the location details, POI name in different languages and details of said point of interest. Each 3D Model stored in the second database is associated with one or more 3D views of a point of interest. Further, a mapping engine is provided and coupled to said first and second database, wherein said mapping engine is configured to map data from the second database with the first database depending upon the current location of the flight. The system comprises a retrieval unit to retrieve the 3D Model and associated 3D views of a point of interest based upon successful mapping of location, and further comprises a processor to process the retrieved point of interest information to integrate the same on the moving map for display and a transmitting unit for transmitting said three dimensional views and information related to the at least one or more points of interest to display unit.

To foregoing and other objects, features and advantages of the invention will be apparent from the following detailed description in conjunction with the drawings described hereinafter. It is to be appreciated that these drawings depict only typical embodiments of the invention and are therefore not to be considered limiting in its scope.

A more complete understanding of the present invention and its embodiments thereof may be acquired by referring to the following description and the accompanying drawings.

DETAILED DESCRIPTION OF THE PRESENT INVENTION

Figure 1:
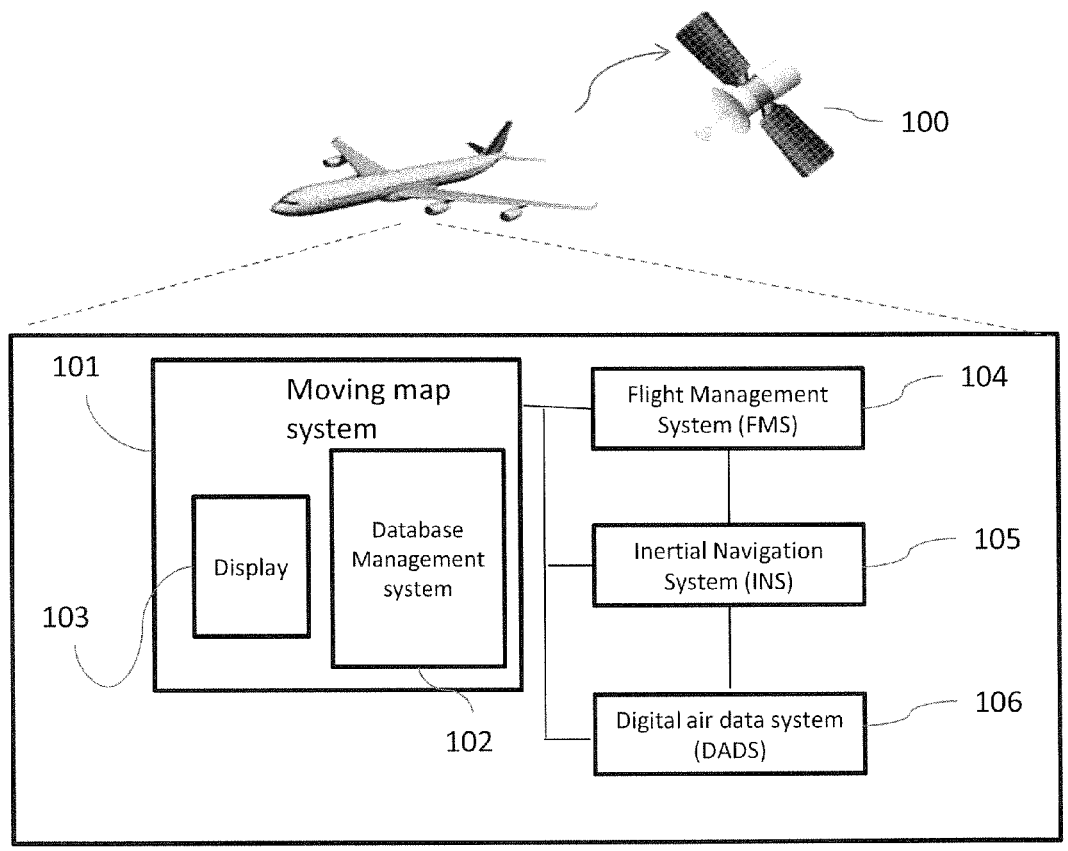
FIG. 1 illustrates certain components of a flight management system as an aircraft travels from a departure point to a destination point.

The modern aircraft operates with updated avionics having precise position location systems, including satellite based location systems such as the Global Positioning System and terrestrial based systems that provide present location with respect to the earth's surface. Additionally, aircrafts includes flight management systems to provide aircraft position and situational awareness information to the aircraft passengers and flight crew. FIG. 1 illustrates certain components of a flight management system as an aircraft travels from a departure point to a destination point. Generally during flight transit, a global positioning system (GPS) satellite (100) is in communication with the flight management system (104) of the aircraft to provide the location information of the aircraft. The primary function of the flight management system (104) is to determine the aircraft's position and to guide the aircraft along a flight path from departure to destination. The flight management system uses GPS receivers to act as a primary sensor as they have the enhanced accuracy and integrity. Typically, the information relating to the flight path is controlled through a control display unit (CDU) which incorporates a screen and keyboard or touch screen and is operatively connected to the flight management system. Using global positioning system, the position of aircraft is determined and the flight management system sends the flight plan details to a moving map system (101) for displaying relevant information on the electronic flight instrument system (EFIS), navigation display (ND), or multifunctional display (MFD). The moving maps system (101) receives the flight data in ARINC format from Flight management system (FMS), Inertial Navigation system (INS), and the Digital Air Data system (DADS) of the aircraft, and uses the same to obtain present position of aircraft and other flight data such as heading, etc.

Further, modern aircrafts are also equipped with Inertial reference system (105) which utilizes gyros and accelerometers in order to calculate the aircraft position. In addition, the aircraft is equipped with digital Air Data System (106) which computes all parameters for aircraft movement by processing static and temperature information along with preprogrammed aircraft data. Computed and available parameters may include at least one of: indicated airspeed, true airspeed, vertical speed, static air temperature, total air temperature, preselected altitude, over-speed warning contacts, uncorrected pressure altitude and barometric corrected altitude.

The moving map system (101) in an aircraft further comprises a database (102), a display unit (103) having a display screen and one or more audio/video outputs, which outputs one or more audio/visuals of flight transit information based on the data stored on the database (102). The moving map system retrieves data from the flight management system (104), inertial navigation system (105) and digital air data system (106) to display the maps on the screen. The display is customizable and fully integrated application with multiple types of contents and programming seamlessly displayed together. Currently, the screens are equipped to display real time maps, such as atlas, ocean floors, day/night maps, and also presents wide variety of information, entertainment and promotional features. Generally the screen displays the maps to the passenger using a virtual camera, which simulates the view of environment outside the flight using the location data obtained from global positioning system and is dependent on different scripts designed to simulate different views in Airshow Moving Maps product. Further, using various predefined scripts, the passengers are displayed various views of flight transit though virtual camera. With the help of flight management system, the passengers are updated on the progress of their flight and terminal arrival information.

The display screen typically displays flight transit information from departure point to destination point and generally includes visualizing one or more information such as departure and destination marker beacons, track line i.e. path of journey from departure to destination, view of aircraft, location of aircraft and other near-by place names. During the flight transit, there may be one or more points of interest between the departure and destination points and described below is the system and method for displaying three-dimensional views of one or more points of interest on the moving maps and various embodiments in reference to accompanying drawings.

Figure 2:
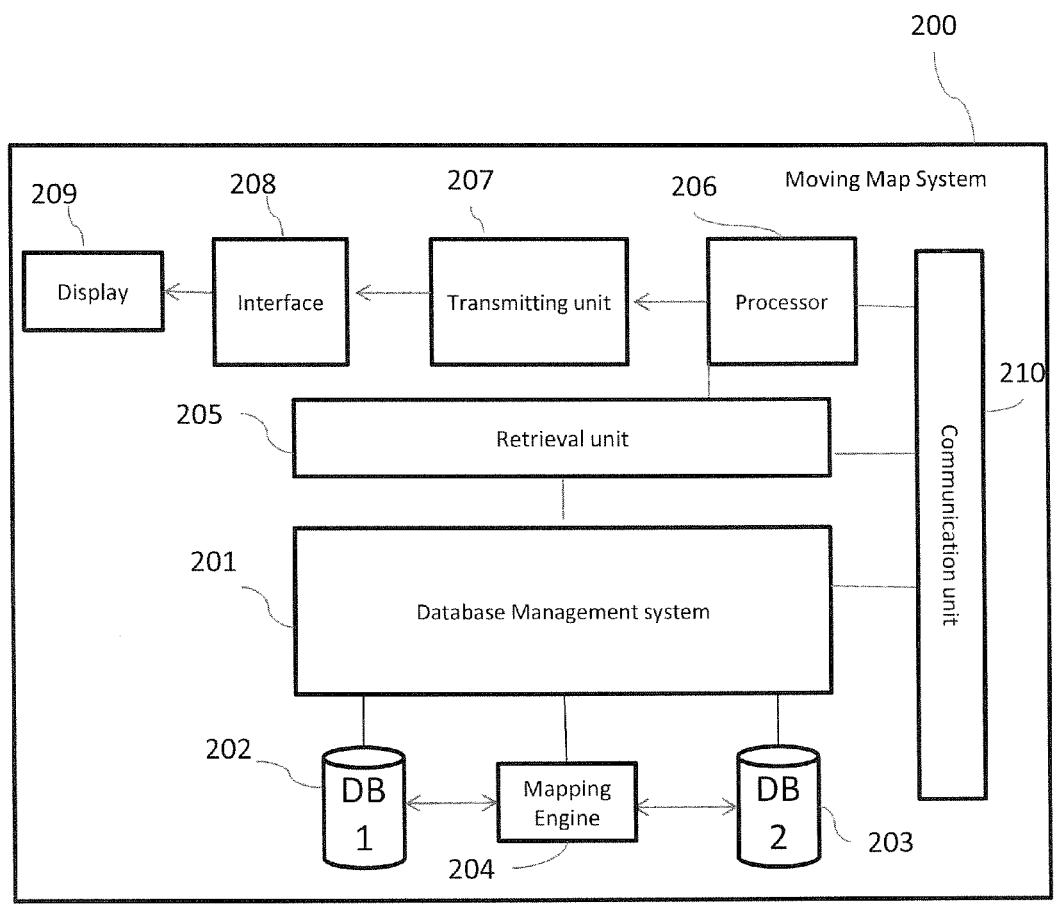
FIG. 2 illustrates a moving map system for displaying a 3 dimensional view of point of interest on the moving map screen according to the embodiment of the present invention.

FIG. 2 illustrates a moving map system (200) for displaying three-dimensional (3D) views of points of interest on the moving map screen according to an embodiment of the present invention. The moving map system according to the present invention comprises a database management system (201) coupled to at least a first database (202). The first database (202) comprises at least the information on identity of airports, airport location, place names and their, latitude and longitudinal position etc. A display unit (209) is provided which is configured to display a moving map based on the information stored on the first database (202) and current location of the flight. The database management system (201) further comprises at least a second database (203), wherein the second database (203) comprises a plurality of three-dimensional models (3-D Models) of points of interests along with the information such as location details, POI names in different languages, and details of such points of interest. Each 3D Model stored in the second database (203) is associated with one or more 3D views of the particular point of interest.

In an embodiment, the second database (203) is physically separated with respect to the first database (202) and the information of the first and second database (202, 203) is mapped using a mapping engine (204) as shown in FIG. 2. In an alternative embodiment, the first database and second database may be integrated into a single database, and the information of first and second database are virtually distinct. The mapping engine (204) is further coupled to the database management system (201) and is configured to map the location of one or more points of interest stored on the second database (203) with a location on the moving map displayed according to information on the first database (202) and the current location of the aircraft.

The database management system (201) is further coupled to a retrieval unit (205), said retrieval unit (205) is configured to retrieve the information regarding a point of interest based on mapping of the location of a point of interest with a location on the moving map and the related 3D Model information stored in the database. The retrieval unit (205) is further coupled to a processor (206), wherein the processor (206) is configured to process the information received from the retrieval unit (205) and access one or more 3D views associated with the 3D Model of the point of interest and further integrates the 3D view of point of interest with a specific mapped location on the moving map. The processor (206) is further coupled to a transmitting unit (207) which enables transmitting the one or more 3 dimensional view of point of interest and related information to the display unit (209) via an interface (208), wherein the said display unit (209) is configured to display the 3D view of point of interest on a mapped location on the moving map.

The moving map system may also comprise a communication unit (210) coupled to at least the database management system (201), retrieval unit (205), processor (206), which enables the communication according to communication protocol known to a person skilled in the art. Further, the communication unit (210) is also configured to retrieve the current location of aircraft, for example from the global positioning system (GPS) receiver of the flight management system.

Figure 3:
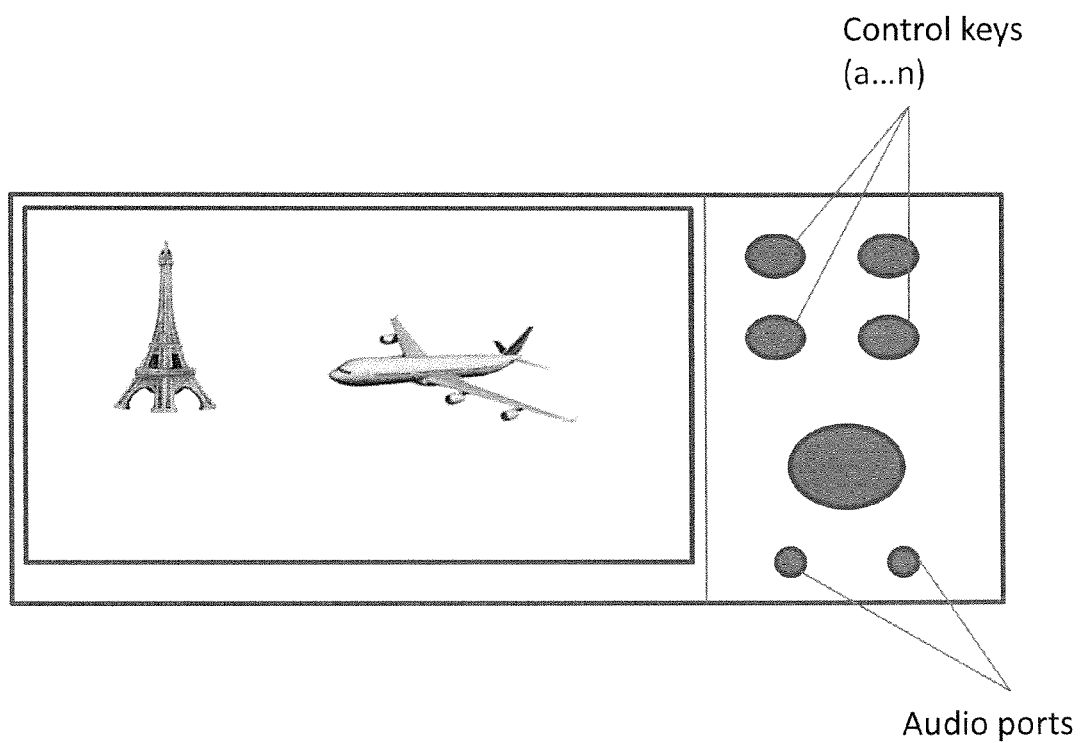
FIG. 3 illustrates a display unit according to an embodiment of the present invention.

FIG. 3 illustrates the display unit according to an embodiment of the present invention. The display unit is equipped with one or more control keys (a . . . n) to access one or more view/options presented to the user during the flight transit. In an embodiment, the control key includes one or more mode selection keys or any other preferred keys as known to a person skilled in the art. In an optional embodiment, the display unit of moving map system may further comprise one or more keys for zooming the view on the moving map. Using the zoom key, the user is able to zoom any portion of moving map display for viewing the 3D views associated with the 3D Model of the point of interest in more detail and precision.

Now, the process of the displaying the 3D views of the one or more point of interest on the moving maps will be explained in reference to accompanying drawings and one or more various embodiments.

Figure 4:
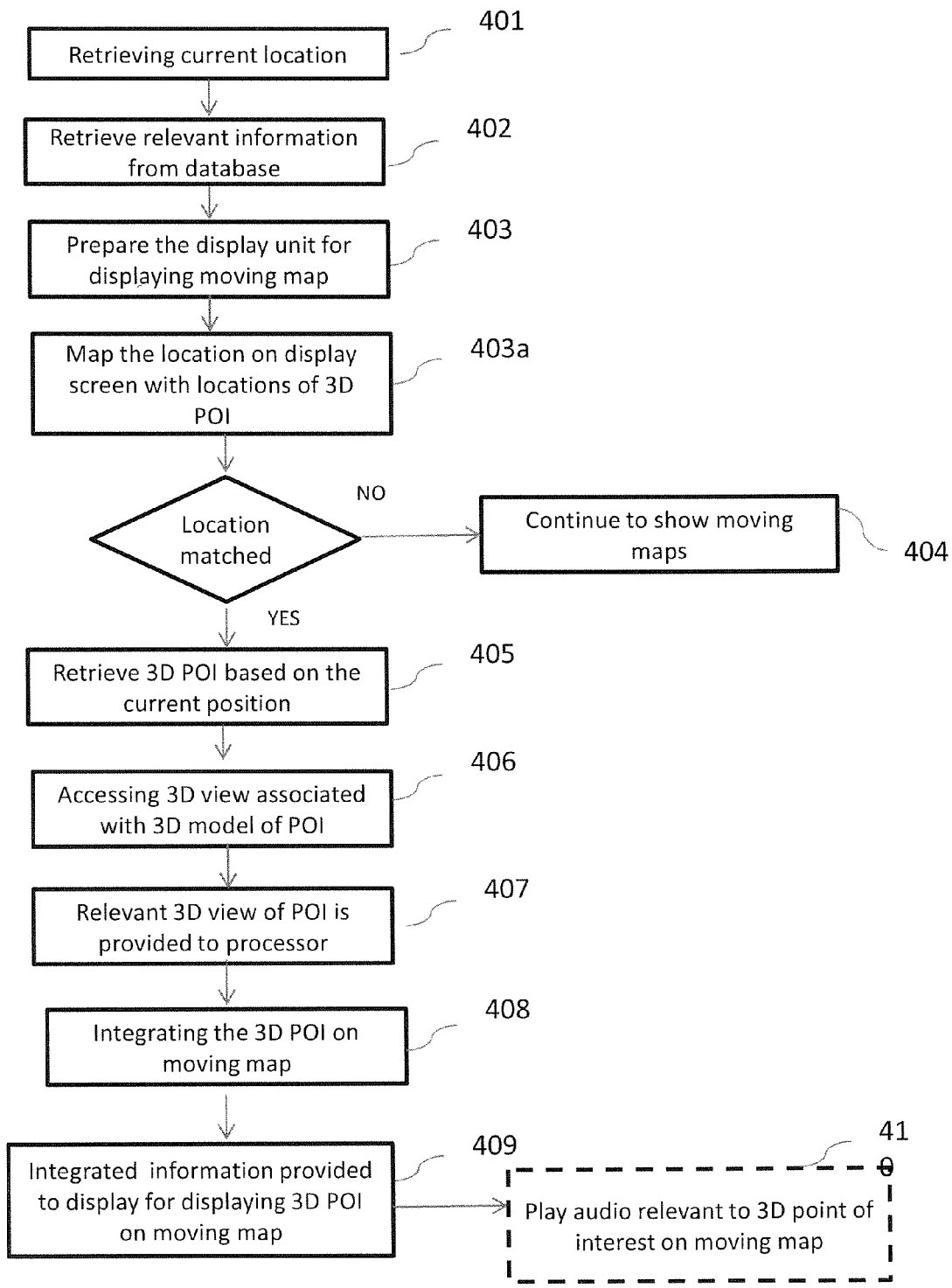
FIG. 4 is a flowchart enabling the visualization of 3-dimensional points of interest on the moving maps according to an embodiment of the present invention.

FIG. 4 is a flow chart illustrating the process of retrieving and displaying 3D views of a point of interest on the moving maps according to an embodiment of the present invention. The moving map as displayed on the screen is typically visualized on rectangular shaped screen which covers boundaries of a specific geographical area. The screen display re-orients itself depending upon the flight speed, directions and transit path and the display changes the boundary of the covered geographical area accordingly. During the flight path, the process begins with retrieving the current location of the aircraft (step 401) obtained by the flight management system. Next, in step 402, the moving map system retrieves the relevant information from the database management system based upon the location of the flight and the corresponding data stored in the one or more databases. This data retrieval may be done through a mapping engine that co-relates the location of the aircraft with one or more points of interest. In step 403, the display unit prepares the data for the moving maps to be displayed to the passenger. The moving map as displayed on the screen covers a specific geographical area and includes one or more latitude and longitudinal locations. As discussed above, during the flight transit, there may be one or more points of interest between the departure and destination points which will be displayed to the passenger on the display screen.

In an exemplary embodiment, when a passenger or user boards a flight and starts the display, the display unit is configured to present to the user a flight plan based on the departure and destination points and in accordance with standard aeronautical flight plans that are known and accepted in the aviation industry. As the flight starts its transit, the moving map system obtains the current location of flight and based on the current location details and other information stored on the first database, a moving map display is visualized on the screen of the display unit. In step 403a, a mapping engine starts mapping the location information on the currently displayed moving map with the location of a point of interest stored on the second database. If the location on the moving map does not match the location of the point of interest stored in the second database, the moving map continues to display the moving map according to current location of flight with relevant flight information like present location, altitude, ground speed, true airspeed, weather information etc. (step 404).

However, when a location on the moving map successfully maps on to a location of a point of interest, in step 405, the retrieval unit retrieves the 3D Model of that point of interest from the database management system. Next in step 406, the 3D views associated with the retrieved 3D Model are accessed. Thereafter, based on the orientation of the aircraft with respect to the point of interest i.e. north/south/east/west, the 3D view of the point of interest is provided to the processor for processing and integration (Step 407). The processor processes the location information of currently displayed moving map and the retrieved 3D Model of the point of interest and integrates the 3D Model at a location matching the location of the point of interest (Step 408). In next step 409, the processor provides the integrated 3D view of the point of interest (based on the 3D Model) on the moving map to the display unit and the display unit displays the integrated information to the passengers/users, which shows the point of interest in a three-dimensional view to the user on the moving map.

In an embodiment, database management system is stored with the predetermined list of various points of interest and the same is automatically displayed on the moving maps as and when a point of interest falls within the range of geographical area covered by the moving map during the flight path between the departure point and the destination point. In another embodiment, the display of one or more points of interest may be based on user selection of the one or more point of interest from the predetermined list. In this embodiment, when a passenger or user boards a flight and starts the display, the display unit may be configured to present to the user a flight plan and also displays a list of points of interest which lies between the departure point and destination point of flight plan. The user with the help of control keys provided on display unit, may selectively choose one or more listed points of interest, which the users wishes to view in three dimension on the moving map during the transit. Upon selection by the user, the database management system stores the users input in the first database. Alternatively, the user input may be stored in the second database. During the flight transit, if the location of the moving map matches the location of one or more points of interest selected by the user, information regarding the one or more points of interest is retrieved based on the selection by the user using the mapping engine, and the same is processed and integrated to the moving map so as to display the 3D views of the one or more points of interest on the moving map.

In another embodiment, the display unit (209) may comprise one or more audio ports, said audio ports configured to present the user an audio including the history of the point of interest being displayed on the moving map and other related information. In an embodiment, the second database comprises one or more audio related information stored thereon corresponding to the one or more points of interest. During the retrieval and display of the one or more points of interest on the moving map (as discussed above with reference to steps illustrated in FIG. 4), the retrieval unit (205) is configured to retrieve the audio stored on the second database (203) and the same is presented to user via connecting a headset connectable to audio ports of display unit (209) (Step 410). Alternatively, the user may be presented option to selectively activate the audio related to point of interest being displayed on the screen.

Figure 5:
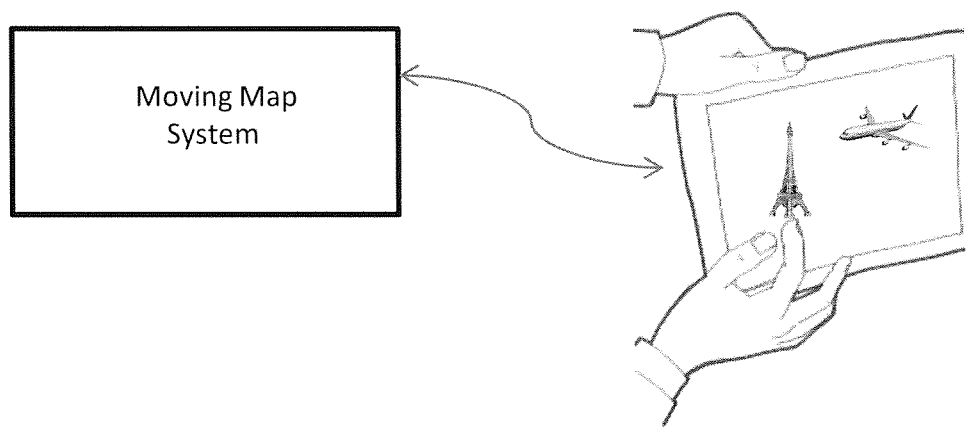
FIG. 5 is an exemplary display of a moving map on the portable device according to an embodiment of the present invention.

In a further embodiment, the point of interest may be shown on the portable device of user/passengers on board the aircraft. To enable viewing of the map display with a 3D view of the one or more points of interest on a portable device, the user will be required to install a software application on the device which would make the device compatible with the moving map system so that the data can be exchanged between the moving map system and device. Upon installation of application, the device may be connected with the moving map system of flight via a wireless communication for example Wi-Fi and the moving map as displayed on the display unit may be synchronized with the device such that the moving map is shown on the screen of device. Further, in an embodiment, the software application as installed on the device provides one or more options to enhance the visual experience of viewing of maps, said options may comprises at least zooming, selection of one or more points of interest, selectively activating or deactivating the viewing of point of interest etc. In an embodiment, the users access the contents of the moving map display via a portable device or a computer or related device connected to a local area network, a wide area network or the like. The portable device may comprise one or more of a hand-held device, a tablet, a phablet, a laptop or the like. A sample illustration of 3D viewing of a point of interest on a handheld device is illustrated in FIG. 5.

The database management system in an embodiment may be stored with specific list of point of interest which occurs between the proposed flight plan between a departure and destination points, which are retrieved and displayed during flight transit. The database management system may also store a list of points of interest irrespective of proposed flight plan and the moving map system is configured to retrieve and display the point of interest on moving maps based on the mapping of locations of point of interest and location on the moving map.

In a further embodiment, the moving map system of the present invention can be configured to initiate a forced view of point of interest. In this embodiment, initially when the user is provided with one or more options, the user may select one or more points of interest and can request a forced view of selected points of interest, when the point of interest is reached during the flight. When the location of selected points of interest matches a location on moving maps, the moving map system is configured to initiate an interrupt message to the user notifying of the approaching points of interest and upon user's approval, the same is displayed on the moving map display.

In addition to displaying the points of interest on moving maps, one or more characteristics of maps may be configured to enhance the visual experience of users and one or more visual aspects of the point of interest is described below according to one or more embodiment of the present invention.

Figure 6:
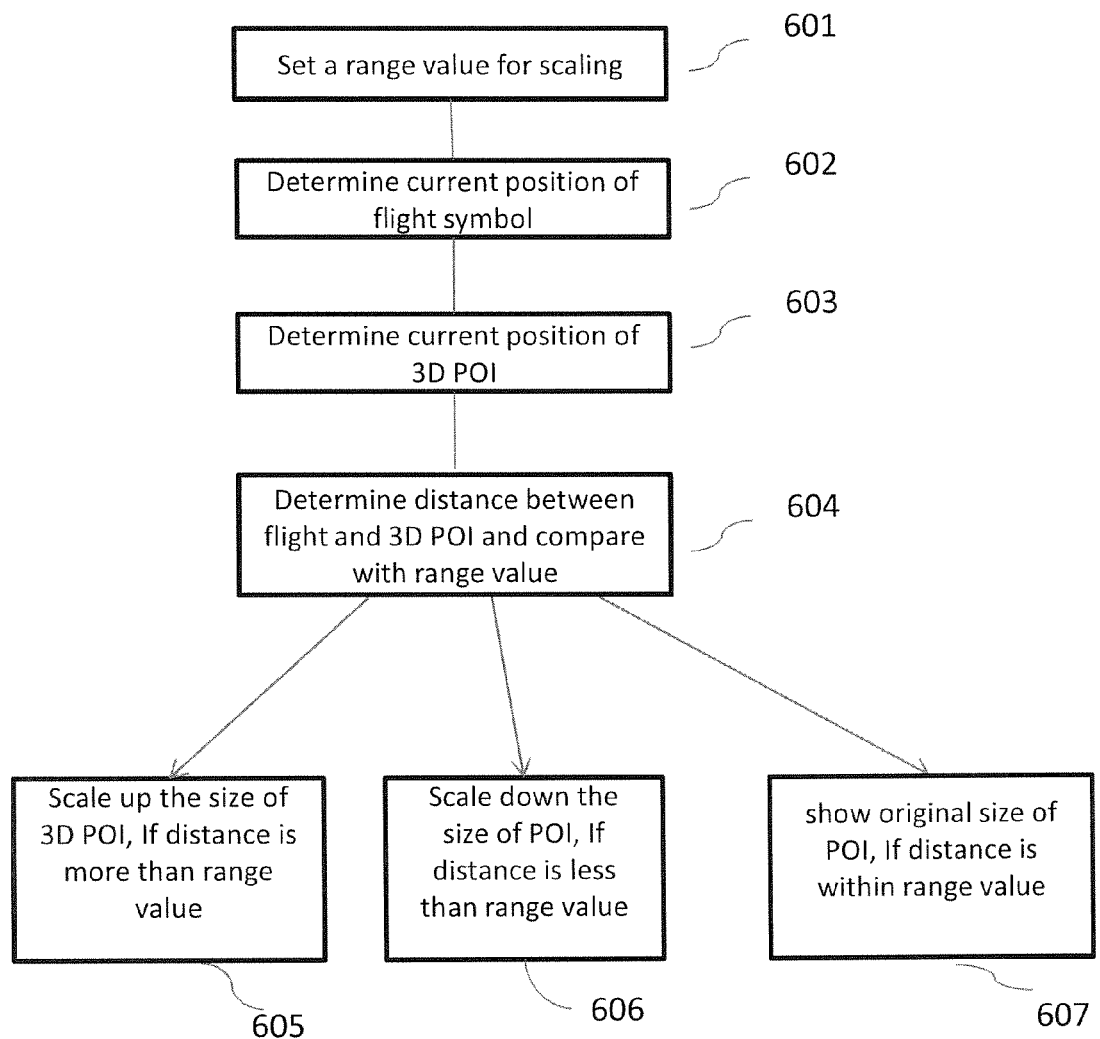
FIG. 6 is a flowchart illustrating the change of display of 3D POI according to an embodiment of the present invention.
Figure 7A:
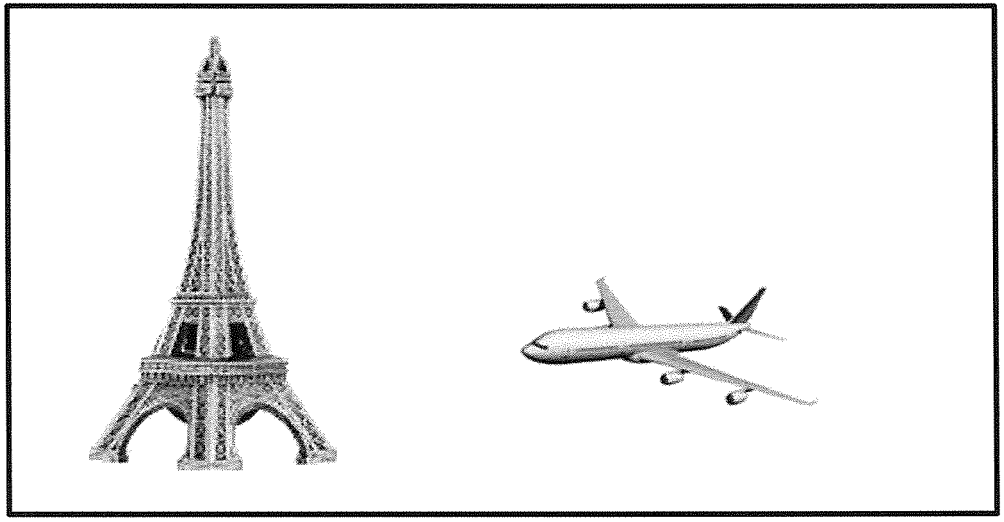
FIG. 7(a) and FIG. 7(b) illustrates the scaling the view of 3-dimensional point of interest (POI) on moving maps according to an embodiment of the present invention.
Figure 7B:
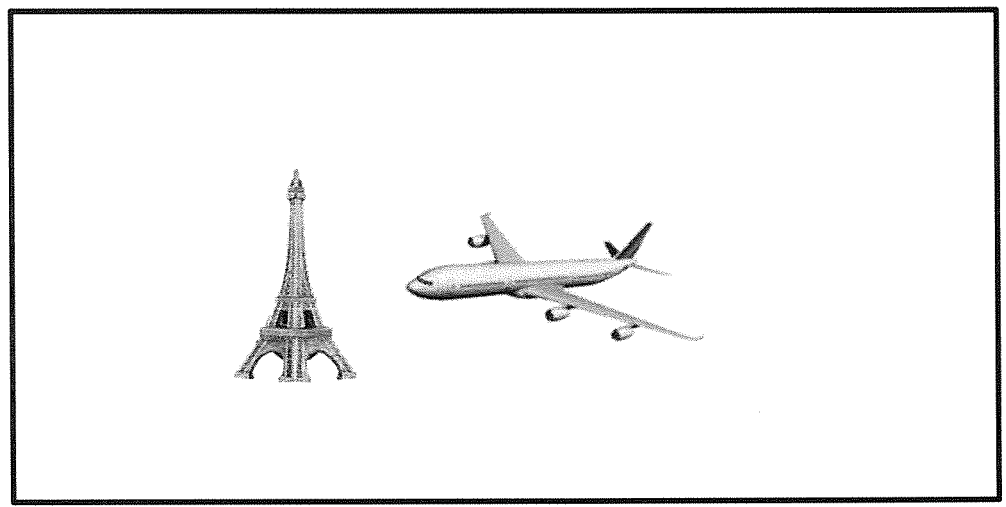

FIG. 6 illustrate a flow chart which illustrates the scaling of images of the point of interest on the moving map. In an exemplary embodiment, the size of the 3D view of the point of interest is scaled up or scaled down depending upon the distance between the point of interest and flight symbol appearing on the moving map. In an embodiment, a range value is defined in the configuration file stored within the database (step 601), which determine the scaling of the size of the 3D view of the points of interest. In order to scale the 3D view, the current position of the flight symbol on the moving map is determined (step 602) and the current position of the point of interest is determined (step 603). Thereafter, the distance between the flight symbol and point of interest is determined and compared with the range value (step 604). If the distance exceeds the range value, then the 3D view of the point of interest is scaled up (step 605) and if the distance is less than the range value, then the 3D view of the point of interest is scaled down (step 606). The up-scaling and down-scaling of the 3D view of a point of interest is performed in step depending on the increase and decrease of the distance as compared to the set range value. If the distance between the flight symbol and the point of interest is within the allowed range value, the moving map continues to display the original size of point of interest (step 607). FIG. 7(*a*) and FIG. 7(*b*) illustrates a sample view of the scaled up and scaled down 3D view of the point of interest on the moving map.

Figure 8:
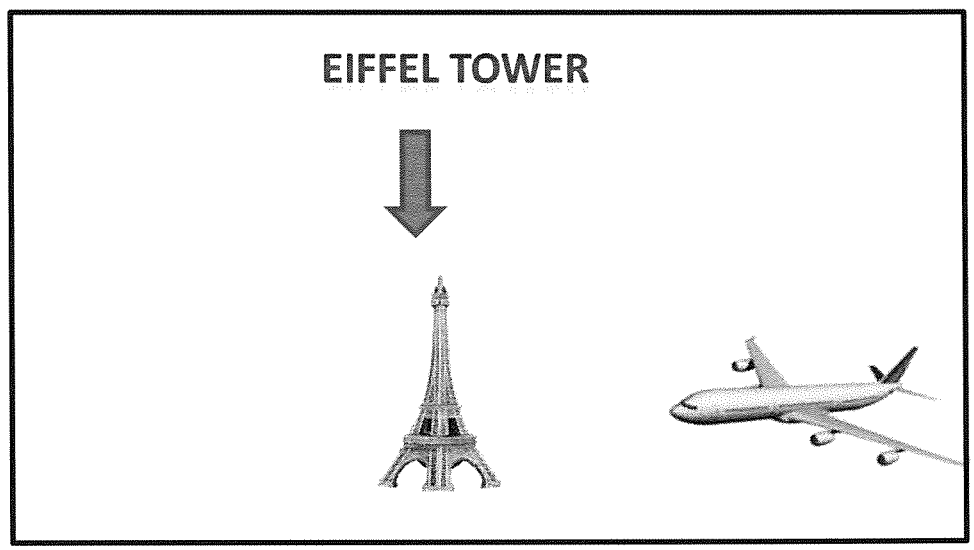
FIG. 8 illustrates the view of name of point of interest according to an embodiment of the present invention.

FIG. 8 illustrates the visualization of the name of a point of interest along with a pointer in moving maps. The 3D view of the point of interest is displayed on the screen through virtual camera and the same is supported by other indicators such as POI name, place name. During the flight transit, the moving map system is configured to show the name of the point of interest facing the virtual camera and is further configured to rotate the name of point of interest based on flight transit to face the virtual camera. In an alternate embodiment each virtual view of the point of interest along with the name of the point of interest is stored as a separate 3D view and associated with the 3D Model of said point of interest.

Figure 9:
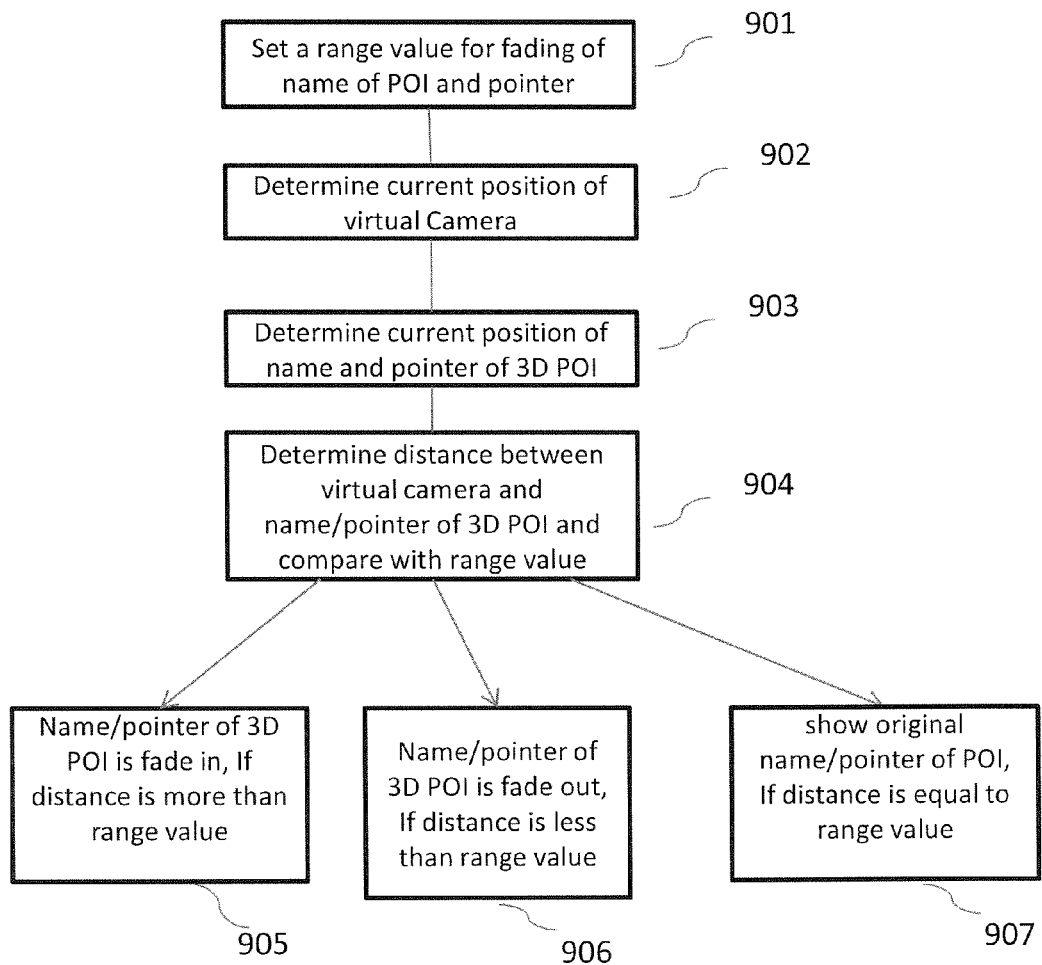
FIG. 9 is a flowchart illustrating the fading of name of 3D POI according to an embodiment of the present invention.

FIG. 9 provides a flowchart which illustrates the change of display of name and pointer of POI according to the embodiment of the present invention. When the virtual camera approaches close to any of the place names or POI names, then the place names & POI names along with their pointers are faded out in steps and as the virtual camera goes away from the place names & POI names, the disappeared names along with pointers reappear in steps. The process begins with defining a range value (step 901) which is a trigger point for fading of name and pointer. During the display, position of the virtual camera (step 902) and the position of the point of interest position (step 903) is retrieved. Then, the distance between the camera position and the POI is determined and subsequently, based on the determined distance, in comparison with defined range for trigger point of fading (step 904), the name and pointer of the point of interest is faded-in if the distance between the virtual camera and point of interest is more than the range value (step 905). The name and pointer is faded-out if the distance between the virtual camera and point of interest is less than the range value (step 906). If the distance between the virtual camera and point of interest is within the applicable range, then the POI name and its pointer are displayed in its original form (step 907). The above features are aimed towards enhancing the visual experience of the passengers.

The moving map system of the present invention is further configured to simulate and visualize different virtual camera positions for enabling one or more views of points of interest according to the predefined scripts of virtual camera.

Figure 10:
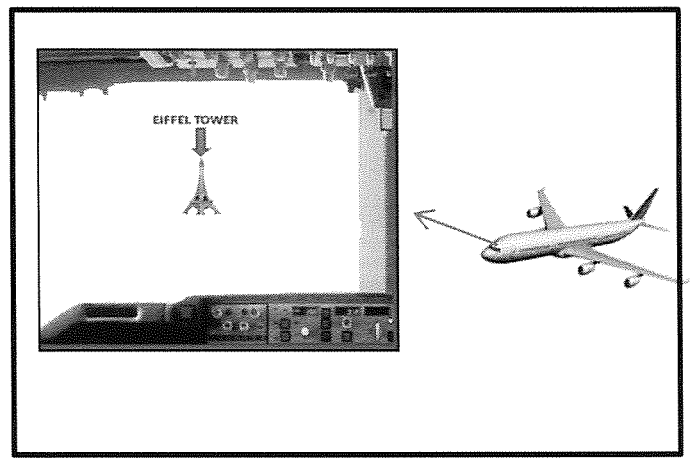
FIG. 10 illustrates one or more views of 3 dimensional points of interest (POI) according to an embodiment of the present invention.
Figure 10:
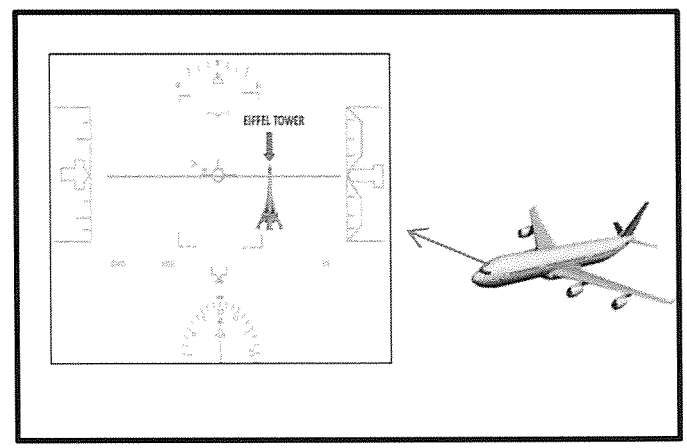
Figure 10:
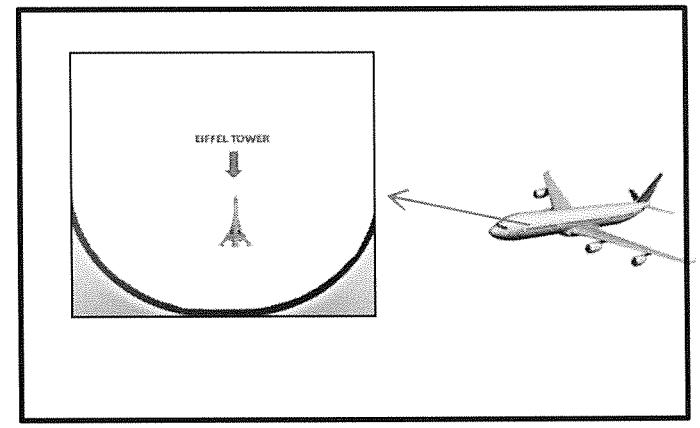

FIG. 10 illustrates one or more 3D views of point of interest comprising at least Head-up display (HUD), Cockpit display and Passenger view. The display unit may be provided with one or more control keys which enable the switching between different available views. In displaying the said views, the virtual camera position is predefined in the database. The Head up Display view gives the illusion to the passenger of looking through the head up display. The Cockpit display view gives an illusion to the passenger of looking from the cockpit. Passenger view gives an illusion of looking out of the window. In the above said modes, the aircraft symbol, track lines are not displayed and the place names and POIs are displayed. In an embodiment, one or more 3D views of the point of interest with respect to flight symbol may be generated and displayed according to the virtual camera script known to a person skilled in the art.

Figure 11:
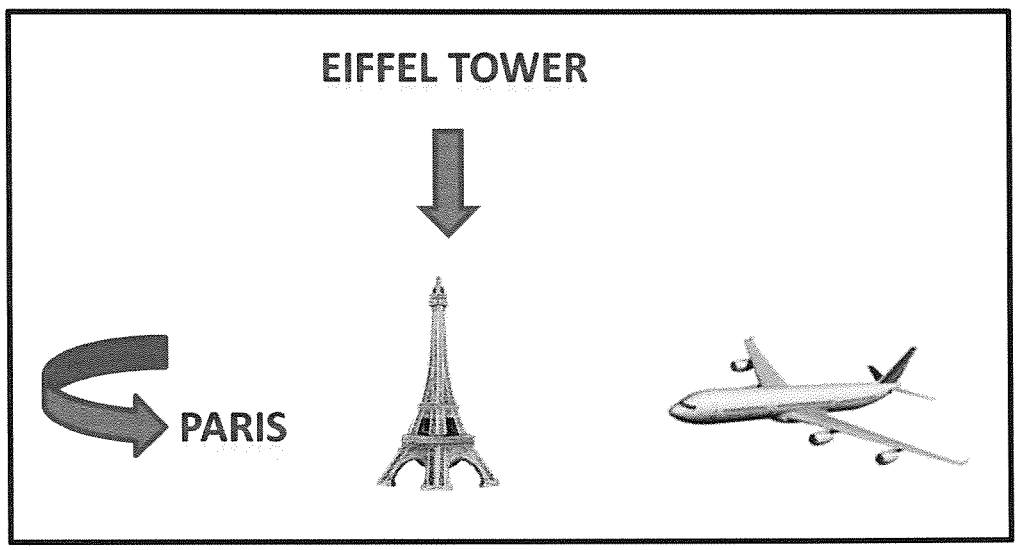
FIG. 11 provides the visual display of pointers of 3 dimensional POI and POI name/place according to an embodiment of the present invention.

According to an embodiment a pointer may be provided to indicate the points of interest and name of place on the moving maps. Further, to clearly distinguish between the pointers, the shape, color and font style of a 3D view of the POI pointer may be different from that of place name pointer as illustrated in FIG. 11.

In an embodiment, a new mode may be provided to the user on the display unit, wherein the new mode shows the passengers the POI rotating horizontally in a fixed location so that the passenger can see the 360 degree 3D view of the monument. In an exemplary embodiment, if POI is any sacred place like temple/mosque then it may not be rotated. The choice of rotation is stored in database. The information related to the POI is displayed on the left side of the screen. This information related to POI is stored in an associated file and optionally, can be stored in database.

The present invention also provides a machine readable medium comprising machine readable instructions to perform one or more functions of moving map system as discussed above. Further, the machine readable medium comprises instructions to generate one or more virtual camera views according to the selection of user.

The invention has been described above with reference to numerous embodiments and specific examples. Many variations will suggest themselves to those skilled in this art in light of the above detailed description. All such obvious variations are within the full intended scope of the appended claims.

We claim:

1. A method of displaying one or more points of interest on a moving map, comprising:
    storing in a first database, information relating to a flight path of an aircraft;
    storing in a second database, at least one three-dimensional model of the at least one or more points of interest said model associated with one or more three-dimensional views of the related point of interest;
    receiving a request to display information related to the at least one or more points of interest;
    retrieving the current location of the aircraft;
    mapping the location of the at least one or more points of interest stored on the second database with the location of the aircraft;
    retrieving the three-dimensional model and associated three-dimensional views and related information of the at least one or more points of interest based on the mapped location;
    integrating the retrieved three-dimensional views and related information of the at least one or more points of interest on the moving map with the mapped location;
    transmitting to a display unit said views and information related to the at least one or more points of interest; and
    displaying the said views and information of the at least one or more points of interest on the moving map.

2. The method as claimed in claim 1, wherein the first database and the second database are virtually distinct.

3. The method as claimed in claim 1, wherein said information relating to the flight path comprises a flight symbol, airport location along with their latitude and longitudinal position, place names and their latitude and longitudinal positions.

4. The method as claimed in claim 1, wherein said related information comprises one or more indicators, said indicators comprises at least name, location details and a pointer.

5. The method as claimed in claim 4, comprising:
    fading-in or fading-out the name and pointer of three dimensional point of interest on moving map, based on increase or decrease of distance between the location of point of interest and virtual camera respectively.

6. The method as claimed in claim 4, wherein the display angle of the name of the one or more point of interest is rotated to face the virtual camera during the flight transit.

7. The method as claimed in claim 4, comprising providing one or more pointers to indicate the name and place of the three dimensional point of interest on moving maps, said one or more pointers are distinct at least in shape, size and color.

8. The method as claimed in claim 1, wherein said related information comprises audio information relating to the one or more points of interest.

9. The method as claimed in claim 1, comprising:
    presenting a list to a user of the one or more points of interest lying on the path between a departure point and a destination point; and
    selectively transmitting of information relating to the one or more points of interest from said list for viewing on the moving map based on the list.

10. The method as claimed in claim 9, further comprising:
    retrieving the three-dimensional model and associated three-dimensional views and related information of the at least one or more points of interest based on the selection of the user and mapping the location of selected point of interest with the location on the moving map.

11. The method as claimed in claim 1, further comprising: switching between different modes of views selected at least from a heads up display view, Cockpit view and passenger view.

12. The method as claimed in claim 1, comprising: scaling the size of the three-dimensional view of the one or more point of interest between a maximum and minimum size on the moving map, based on the increase or decrease of distance between the location of point of interest and flight symbol.

13. A system (200) for displaying points of interest on a moving map, comprising:
- a first database (202) to store information relating to a flight path of an aircraft;
- a display unit (209), for displaying via a virtual camera a moving map based on data stored on first database (202) and current location of flight;
- a second database (203) for storing at least one three-dimensional model of the at least one or more points of interest said model associated with one or more three-dimensional views of the related point of interest;
- a mapping engine (204) coupled to said first database (202) and second database (203), said engine (204) configured to map the location of the one or more points of interest stored on second database (203) with data stored on first database (202) and current location of flight;
- a retrieval unit (205) configured to retrieve the three-dimensional model, associated three-dimensional views and related information of the at least one or more points of interest based on the mapped location;
- a processor (206) coupled to said retrieval unit (205) and is configured to process and integrate the retrieved three dimensional point of interest on the moving map at the mapped location; and
- a transmitting unit (207) coupled to said processor (206) and is configured to transmit to a display unit (209) said views and information related to the at least one or more points of interest.

14. The system as claimed in claim 13, further comprising a communication unit (210) coupled to at least retrieval unit (205), processor (206) and database management system (201), said communication unit (210) is configured to retrieve the current location of the flight.

15. The system as claimed in claim 13, wherein said information relating to the flight path comprises a flight symbol, airport location along with their latitude and longitudinal position, place names and their latitude and longitudinal positions.

16. The system as claimed in claim 13, comprising an interface (208), said interface (208) enables the display of the integrated three dimensional point of interest on the moving map on the display unit (209).

17. The system as claimed in claim 13, wherein the first database (202) and the second database (203) are virtually distinct.

18. The system as claimed in claim 13, wherein the display unit (209) is configured to provide to the user a list of the one or more points of interest lying on the path between a departure point and a destination point.

19. The system as claimed in claim 13, wherein the transmitting unit (207) is configured to selectively transmit information relating to the one or more points of interest from said list for viewing on the moving map based on the list.

20. The system as claimed in claim 13, wherein the display unit (209) is provided with one of more control keys for selecting and activating one or more point of interest from the list for viewing on the moving maps.

21. The system as claimed in claim 13, wherein the display unit (209) is provided with one or more audio ports, said audio ports configured to play audio comprising details of three dimensional point of interest being displayed on the moving map.

22. The system as claimed in claim 13, wherein the communication unit (210) further couples one or more hand-held devices with processor (206), said at least one hand-held device is configured to view the moving map with three dimensional point of interest.

* * * * *

UNITED STATES PATENT AND TRADEMARK OFFICE
CERTIFICATE OF CORRECTION

PATENT NO. : 9,163,944 B2  
APPLICATION NO. : 14/475856  
DATED : October 20, 2015  
INVENTOR(S) : Rajasekhar Reddy Satti Page 1 of 1

It is certified that error appears in the above-identified patent and that said Letters Patent is hereby corrected as shown below:

On the Title page of the Patent, please amend the Applicant from the inventor, "Rajasekhar Reddy Satti", to the following:

-- (71) Applicant: Rockwell Collins, Inc., Cedar Rapids, IA --

On the Title page of the Patent, please amend the Attorney, Agent, or Firm from "Hudak, Shunk & Farine Co., LPA" to the following:

-- (74) Attorney, Agent, or Firm - Angel N. Gerdzhikov; Donna P. Suchy; and Daniel M. Barbieri --

Signed and Sealed this  
First Day of December, 2015

Michelle K. Lee  
*Director of the United States Patent and Trademark Office*